US011152788B2

United States Patent
Takahashi et al.

(10) Patent No.: US 11,152,788 B2
(45) Date of Patent: Oct. 19, 2021

(54) POWER SYSTEM

(71) Applicant: Panasonic Intellectual Property Management Co., Ltd., Osaka (JP)

(72) Inventors: Yasufumi Takahashi, Osaka (JP); Tomoki Ito, Hyogo (JP); Atsushi Shimizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/373,031

(22) Filed: Apr. 2, 2019

(65) Prior Publication Data
US 2019/0326754 A1  Oct. 24, 2019

(30) Foreign Application Priority Data
Apr. 19, 2018 (JP) .............................. JP2018-080689

(51) Int. Cl.
*H02J 3/32* (2006.01)
*H01M 8/22* (2006.01)
(Continued)

(52) U.S. Cl.
CPC ................. *H02J 3/32* (2013.01); *G05F 1/66* (2013.01); *H01M 8/22* (2013.01); *H02J 3/387* (2013.01); *H01M 8/04313* (2013.01)

(58) Field of Classification Search
CPC .... H02J 3/32; H02J 3/387; H02J 3/381; H02J 2300/30; G05F 1/66; H01M 8/22
See application file for complete search history.

(56) References Cited

U.S. PATENT DOCUMENTS 6,674,263 B2 * 1/2004 Agbossou ........... H01M 16/006
320/101
7,119,458 B2 * 10/2006 Barnes .................... H02J 9/061
307/65
(Continued)

FOREIGN PATENT DOCUMENTS

JP            H0777459      *   3/1995 ............. G01H 17/00
JP      2006-236741 A       9/2006
(Continued)

OTHER PUBLICATIONS

The Extended European Search Report dated Apr. 29, 2019 for the related European Patent Application No. 19164848.4. pp. 6.

*Primary Examiner* — Kenneth M Lo
*Assistant Examiner* — Olvin Lopez Alvarez
(74) *Attorney, Agent, or Firm* — McDermott Will and Emery LLP

(57) ABSTRACT

A power system includes: a storage battery; a water electrolyzer; a fuel cell that generates electricity using hydrogen supplied from a hydrogen reservoir that stores hydrogen generated by the water electrolyzer; a detector that detects whether there is a person in a building; and a controller that performs at least one of first control and second control. The first control determines a priority between the storage battery and the water electrolyzer, to which electric power is supplied from a power generation device using renewable energy, based on information detected by the detector. The second control determines a priority between the storage battery and the fuel cell, from which electric power is supplied to a power load provided in the building, based on the information detected by the detector.

14 Claims, 5 Drawing Sheets

(51) Int. Cl.
*H02J 3/38* (2006.01)
*G05F 1/66* (2006.01)
*H01M 8/04313* (2016.01)

(56) References Cited

U.S. PATENT DOCUMENTS

| | | | | |
|---|---|---|---|---|
| 9,408,268 B2* | 8/2016 | Recker, V | ............... | H05B 45/10 |
| 2002/0171397 A1* | 11/2002 | Adrian | ................ | H01M 16/003 |
| | | | | 320/119 |
| 2005/0068176 A1* | 3/2005 | Ko | ........................ | G08B 13/00 |
| | | | | 340/545.2 |
| 2006/0210851 A1* | 9/2006 | Komachiya | ....... | H01M 8/04597 |
| | | | | 429/416 |
| 2006/0276938 A1* | 12/2006 | Miller | .................... | G05B 15/02 |
| | | | | 700/295 |
| 2009/0048716 A1* | 2/2009 | Marhoefer | .......... | H01M 8/0656 |
| | | | | 700/291 |
| 2010/0017045 A1* | 1/2010 | Nesler | ................... | G06Q 50/06 |
| | | | | 700/296 |
| 2010/0061315 A1* | 3/2010 | Cordeiro | ............ | H04W 72/082 |
| | | | | 370/329 |
| 2011/0001436 A1* | 1/2011 | Chemel | ................ | H05B 47/155 |
| | | | | 315/291 |
| 2014/0021785 A1* | 1/2014 | Munier | ................... | H02J 1/102 |
| | | | | 307/25 |
| 2014/0062692 A1* | 3/2014 | Li | .......................... | G08B 29/04 |
| | | | | 340/521 |
| 2015/0250439 A1* | 9/2015 | Ishii | ........................ | A61B 6/54 |
| | | | | 378/115 |
| 2015/0270745 A1* | 9/2015 | Ogura | ....................... | H02J 3/38 |
| | | | | 307/66 |
| 2016/0248137 A1* | 8/2016 | Curien | ............... | H01M 8/04373 |
| 2016/0266595 A1* | 9/2016 | Creed | .................... | G05B 15/02 |
| 2018/0203570 A1* | 7/2018 | Franke | ..................... | G01L 1/26 |
| 2018/0316030 A1* | 11/2018 | Cader | ............... | H01M 8/04373 |
| 2018/0375444 A1* | 12/2018 | Gamroth | ................. | H04Q 9/00 |
| 2020/0053651 A1* | 2/2020 | Lee | ........................ | G06F 1/3231 |

FOREIGN PATENT DOCUMENTS

| | | | | |
|---|---|---|---|---|
| JP | 200767312 | * | 3/2007 | ............ Y02E 10/50 |
| JP | 2010-233362 | | 10/2010 | |
| JP | 2010233362 | * | 10/2010 | ................ H02J 3/46 |
| JP | 2015139066 | * | 7/2015 | ................ H04Q 9/00 |
| WO | WO2016075725 | * | 5/2016 | ................ H02J 3/32 |
| WO | 2017/013751 | | 1/2017 | |

* cited by examiner

POWER SYSTEM

BACKGROUND

1. Technical Field

The present disclosure relates to a power system.

2. Description of the Related Art

In recent years, various techniques for supplying electric power obtained from renewable energy to a storage battery provided in a building have been offered.

Japanese Patent No. 5547902 discloses a human detection unit provided in the photovoltaic power generation device and the storage battery where the electric utility rate information of electric power supplied from the grid is acquired, control for charging and discharging the storage battery economically from the average value of the electric utility rate of the amount of electricity stored in the storage battery is performed, and electric power is suppled to facilities in the building by performing setting from a plurality of modes based on human detection information.

In addition, in Japanese Patent No. 6189448 discloses a control unit that stores surplus electric power, which is not supplied from the photovoltaic power generation device to the facility, in the storage battery and the hydrogen production device in a form of electricity and hydrogen during the day, and controls electric power from the fuel cell and the storage battery at night, where based on the predicted value of the power generation amount and the predicted value of the electric power demand amount, the electric power to be supplied to the storage battery and the hydrogen production device during the day is to determined, and the electric power to be supplied from the storage battery and the fuel cell to the facility at night is determined.

SUMMARY

However, the conventional example has not taken it into consideration to appropriately store the electric power obtained from renewable energy in a device suitable for short-term energy storage and a device suitable for long-term energy storage. In addition, in the conventional example, no consideration has been given to an appropriate supply of electric power to a power load provided in a building from a device suitable for short term energy output and a device suitable for long-term energy output.

One non-limiting and exemplary embodiment provides a power system capable of appropriately storing electric power obtained from renewable energy in a device suitable for short-term energy storage and a device suitable for long-term energy storage. One non-limiting and exemplary embodiment provides a power system capable of appropriately supplying electric power to a power load provided in a building from a device suitable for short term energy output and a device suitable for long-term energy output.

In one general aspect, the techniques disclosed here feature a power system that includes: a storage battery; a water electrolyzer; a fuel cell that generates electricity using hydrogen supplied from a hydrogen reservoir that stores hydrogen generated by the water electrolyzer; a detector that detects whether there is a person in a building; and a controller that performs at least one of first control and second control. The first control determines a priority between the storage battery and the water electrolyzer, to which electric power is supplied from a power generation device using renewable energy, based on information detected by the detector. The second control determines a priority between the storage battery and the fuel cell, from which electric power is supplied to a power load provided in the building, based on the information detected by the detector.

The power system of one aspect of the present disclosure has an effect of capable of appropriately storing the electric power obtained from renewable energy in a device suitable for short-term energy storage and a device suitable for long-term energy storage. In addition, the power system of one aspect of the present disclosure has an effect of capable of appropriately supplying electric power to a power load provided in a building from a device suitable for short term energy output and a device suitable for long-term energy output.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1A:
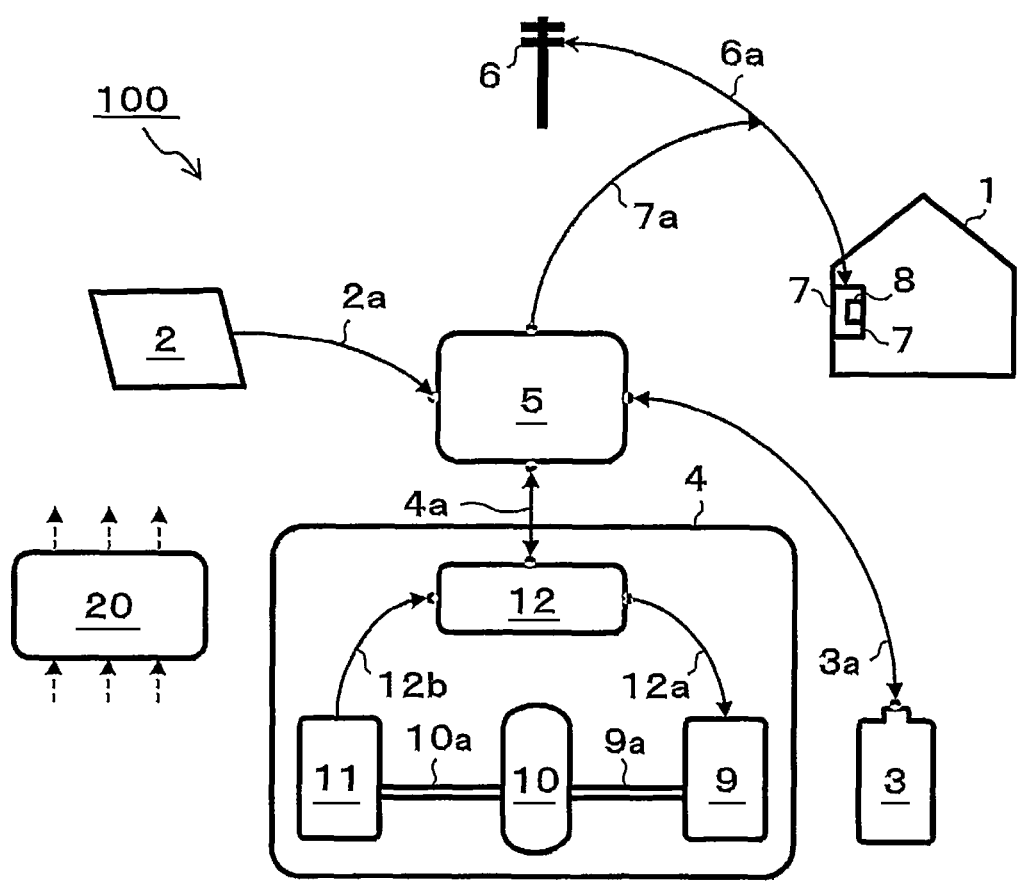
FIG. 1A is a diagram illustrating an example of a power system according to an embodiment.

Devices suitable for short-term energy storage and short-term energy output may include, for example, a storage battery. Further, devices suitable for long-term energy storage and long-term energy output may include, for example, a hydrogen energy storage device including a water electrolyzer, a hydrogen reservoir and a fuel cell.

The storage battery, compared with the hydrogen energy storage device, can be charged and discharged in high power with a high energy conversion efficiency although its storage capacity is small, so that the storage battery is suitable for short-term energy storage and short term energy output. On the other hand, the hydrogen energy storage device, as compared with the storage battery, has a large storage capacity although its maximum electric power that the hydrogen energy storage device can receive and generate is small, so that the hydrogen energy storage device is suitable for long-term energy storage and long-term energy output.

When the storage battery and the hydrogen energy storage device are installed together in a building, it has been found that when there is a person in the building, and when there is no person in the building, highly efficient power control of a power system is possible by determining the priority of the power supply obtained from renewable energy to each of the storage battery and the hydrogen energy storage device. In addition, it has been found that when there is a person in the building, and when there is no person in the building, highly efficient power control of a power system is possible by determining the priority of the power supply to the power load installed in the building from each of the storage battery and the hydrogen energy storage device.

That is, a power system according to a first aspect of the present disclosure includes: a storage battery; a water electrolyzer; a fuel cell that generates electricity using hydrogen supplied from a hydrogen reservoir that stores hydrogen generated by the water electrolyzer; a detector that detects whether there is a person in a building; and a controller that performs at least one of first control and second control. The first control determines a priority between the storage battery and the water electrolyzer, to which electric power is supplied from a power generation device using renewable energy, based on information detected by the detector. The second control determines a priority between the storage battery and the fuel cell, from which electric power is supplied to a power load provided in the building, based on the information detected by the detector.

According to such a configuration, the power system of the present aspect can appropriately store electric power obtained from renewable energy in a storage battery suitable for short-term energy storage and a water electrolyzer suitable for long-term energy storage. In this way, highly efficient power control of the power system is performed.

In addition, the power system of the present aspect can appropriately supply the electric power to the power load provided in the building from the storage battery suitable for short-term energy output and the fuel cell suitable for long-term energy output. In this way, highly efficient power control of the power system is performed. To perform at least one of the first control and the second control means to perform the first control, the second control, or the first control and the second control.

A power system according to a second aspect of the present disclosure is the power system according to the first aspect, when the detector detects that there is a person in the building, the controller, in the first control, prioritizes the storage battery over the water electrolyzer as a destination to which the electric power is supplied from the power generation device using renewable energy, and causes the storage battery to receive the electric power from the power generation device.

When the detector detects that there is a person in the building, it is predicted that the power consumption of the power load provided in the building will increase after this detection. At this time, in the power system of the present aspect, the storage battery capable of receiving high power with a higher energy conversion efficiency is prioritized over the water electrolyzer, and the storage battery is caused to receive the surplus electric power of the power generation device, so that the amount of electricity stored in the storage battery is increased as much as possible, and it is possible to prepare for an increase in power consumption of the power load.

A power system according to a third aspect of the present disclosure is the power system according to the first aspect or the second aspect wherein when the detector does not detect that there is a person in the building, the controller, in the first control, prioritizes the water electrolyzer over the storage battery as a destination to which the electric power is supplied from the power generation device using renewable energy, and causes the water electrolyzer to receive the electric power from the power generation device.

When the detector does not detect that there is a person in the building, it is predicted that the power consumption of the power load provided in the building will not increase for a while after this detection. That is, it is predicted that the period during which the surplus electric power of the power generation device is generated will continue for a while.

At this time, if the storage battery having storage capacity smaller than that of the hydrogen energy storage device is prioritized over the water electrolyzer, and the storage battery is caused to receive the power generated by the power generation device, the storage battery may be fully charged at an early stage. As a result, in the remaining period during which the surplus electric power of the power generation device is generated, it is necessary to store hydrogen (power reception) using this surplus electric power only by the water electrolyzer having the smaller maximum electric power that can be received than the storage battery. In this case, since there is a possibility that the surplus electric power that cannot be received by the water electrolyzer is transmitted to the system, the amount of electricity stored in the storage battery and the hydrogen energy storage device may decrease during the period in which the surplus electric power of the power generation device is generated.

Therefore, the electric power system according to the present aspect prioritizes the water electrolyzer over the storage battery when the detector does not detect that there is a person in the building, and causes the water electrolyzer to receive the electric power generated by the power generation device, so that it is possible to extend the period before the storage battery is fully charged. As a result, the period during which power is received by both the storage battery and the water electrolyzer among the period in which the surplus electric power of the power generation device is generated is extended. Therefore, the amount of electric power transmitted to the system can be reduced during the period in which the surplus electric power of the power generation device is generated. In this way, the electric power system according to the present aspect can increase the amount of electricity stored in the storage battery and the hydrogen energy storage device when the detector does not detect that there is a person in the building, compared with a case where the storage battery is caused to preferentially receive the power generated by the power generation device.

A power system according to a fourth aspect of the present disclosure is the power system according to any one of the first aspect to the third aspect wherein when the detector detects that there is a person in the building, the controller, in the second control, prioritizes the fuel cell over the storage battery as a source from which the electric power is supplied to the power load, and causes the fuel cell to supply the electric power to the power load.

When the detector detects that there is a person in the building, it is predicted that the power consumption of the power load provided in the building will increase after this detection. Therefore, when the surplus electric power of the power generation device is zero, the fuel cell having a slower response than the storage battery is activated, and the electric power is supplied to the power load preferentially from the fuel cell, so that the electric power of the storage battery can be saved. In this way, the electric power system according to the present aspect can increase the electric power supplied from the storage battery and the fuel cell to the power load, compared with the case where the electric power is supplied to the power load preferentially from the storage battery. More detail in this regard will be described.

As mentioned above, although the storage battery has a small storage capacity, the storage battery can output high power with high energy conversion efficiency, compared with the hydrogen energy storage device.

Therefore, if the storage battery is preferentially discharged, there is a possibility that the amount of electricity stored in the storage battery becomes zero at an early stage. As a result, the electric power is generated only by the fuel cell of the hydrogen energy storage device during the remaining period when the surplus electric power of the power generation device is zero. Since the hydrogen energy storage device has a large storage capacity, and the maximum electric power of the fuel cell is small, compared with the storage battery, there is a possibility that hydrogen may remain while hydrogen in the hydrogen reservoir of the hydrogen energy storage device is not sufficiently consumed during the remaining period.

Therefore, the power system of the present embodiment causes the fuel cell to preferentially generate the power. As an example, the supply of the base electric power out of the power consumption of the power load from the fuel cell, and the supply of the short term fluctuating power out of electric power of the power load from the storage battery make it possible to increase the electric power supplied from both of them. In this way, it is possible to extend the period before the amount of electricity stored in the storage battery becomes zero. As a result, it is possible to increase the hydrogen consumption amount in the hydrogen reservoir of the hydrogen energy storage device in the remaining period. In other words, it is possible to increase the electric power to be supplied to the power load from the storage battery and the fuel cell.

A power system according to a fifth aspect of the present disclosure is the power system according to any one of the first aspect to the fourth aspect, wherein when the detector does not detect that there is a person in the building, the controller, in the second control, prioritizes the storage battery over the fuel cell as a source from which the electric power is supplied to the power load, and causes the storage battery to supply electric power to the power load.

When the detector does not detect that there is a person in the building, it is predicted that the power consumption of the power load provided in the building will not increase for a while after this detection. That is, in this case, even if the electric power is supplied to the power load preferentially from the storage battery, it is possible to cover the power consumption of the power load within the range of the storage capacity of the storage battery. At this time, if the electric power is supplied to the power load preferentially from the fuel cell, there is a possibility that intermittent low output and low efficiency operation in the fuel cell is performed. However, the power system of the present aspect can reduce this possibility under the second control described above.

Hereinafter, with reference to the attached drawings, specific examples of the respective aspects of the present disclosure will be described. Specific examples described below represent an example of the above-described respective aspects. Therefore, unless otherwise stated in the claims, the shapes, materials, numerical values, components, arrangement positions of components, connection form do not limit the respective aspects described above. In addition, the components not described in the independent claim illustrating the top level concept of the present aspect among the following components are described as optional components. In addition, in the drawings, explanation for items with the same reference numerals may be omitted. In addition, for easy understanding of the drawings, respective components may be schematically illustrated, and the shape and size ratio thereof may not be accurately displayed.

EMBODIMENTS

[Device Configuration]

Figure 1B:
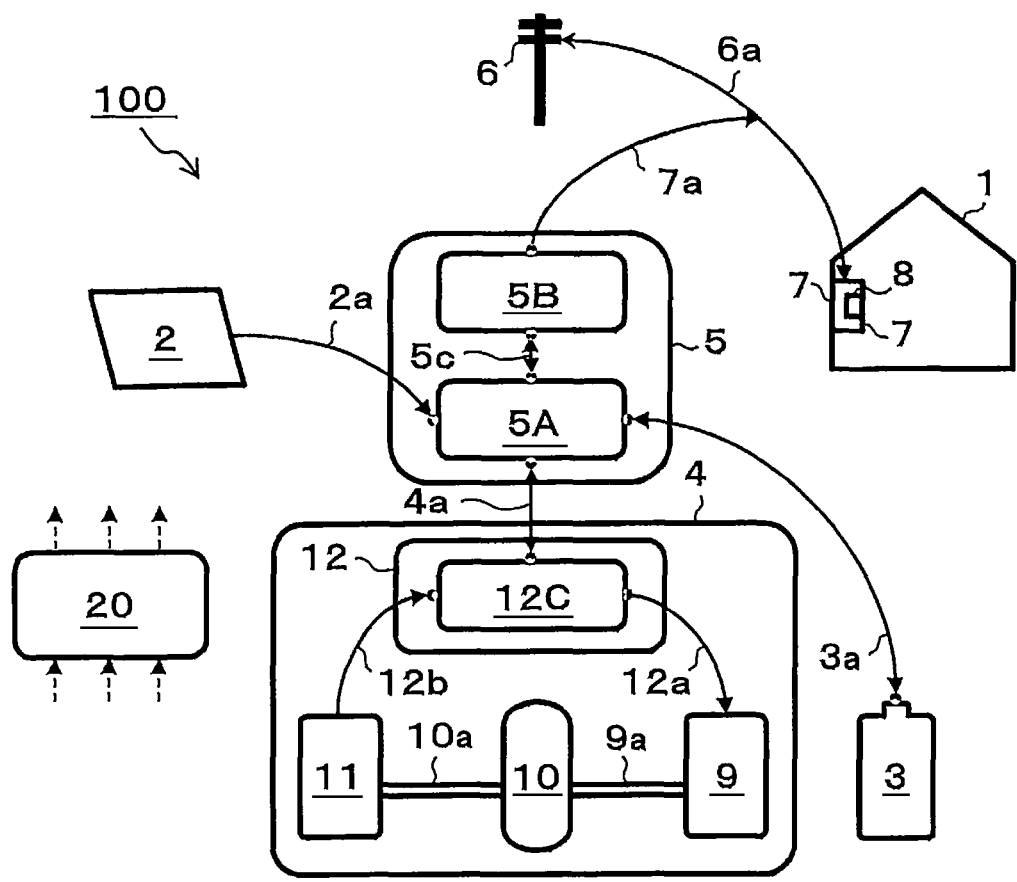
FIG. 1B is a diagram illustrating an example of a power system according to the embodiment.

FIGS. 1A and 1B are diagrams illustrating an example of a power system according to an embodiment. The specific example of a first power converter 5 and a second power converter 12 of FIG. 1 are illustrated in FIG. 1B.

In the example illustrated in FIG. 1A, a power system 100 includes a building 1, a power generation device 2, a storage battery 3, a hydrogen energy storage device 4, the first power converter 5, a grid 6, and a controller 20. The hydrogen energy storage device 4 includes the second power converter 12, a fuel cell 11, a hydrogen reservoir 10, and a water electrolyzer 9. In the power system 100 of the present embodiment, as illustrated in FIG. 1B, the first power converter 5 includes, for example, a DC/DC converter 5A and a DC/AC converter 5B. The second power converter 12 includes, for example, a DC/DC converter 12C. In the power system 100 of the present embodiment, a distribution board 7 in the building 1 is provided with a wattmeter 8.

The power generation device 2 is a device that generates electricity using renewable energy. The power generation device 2 supplies, as required, the electric power generated by the power generation device 2, to the building 1, the storage battery 3, and the hydrogen energy storage device 4. The power generation device 2 may be of any type as long as it has such a power generation function. The power generation device 2 may include, for example, a solar cell. When the power generation device 2 is a solar cell, the power generation device 2 may be installed on the roof of the building 1.

The storage battery 3 is a battery that can be used by repeating charge/discharge. The storage battery 3 supplies, as required, the electric power stored in the storage battery 3 to the building 1. The storage battery 3 may be of any type as long as it has such a power storage function.

The water electrolyzer 9 is a device that generates hydrogen by electrolysis of water. Although not illustrated in the figure, equipment necessary for generating hydrogen in the water electrolyzer 9 is appropriately provided. For example, a water pump that supplies water to the water electrolyzer 9, an electrolyte membrane that conducts protons generated by electrolysis of water, and the like may be provided. In addition, a catalyst layer may be provided on each of the main surfaces of the electrolyte membrane. A voltage applying device that applies a voltage between these catalyst layers may be provided.

The hydrogen reservoir 10 is a device that stores hydrogen generated by electrolysis of water in the water electrolyzer 9. The hydrogen reservoir 10 may have any configuration as long as it can store such hydrogen. The hydrogen reservoir 10 may include, for example, a tank.

The fuel cell 11 is a device that generates electricity using hydrogen in the hydrogen reservoir 10 that stores hydrogen generated by the water electrolyzer 9. The fuel cell 11 supplies, as required, the electric power generated by the fuel cell 11 to the building 1. The fuel cell 11 may be of any type as long as it has such a power generation function. The fuel cell 11 may include, for example, a polymer electrolyte fuel cell, a solid oxide fuel cell, a phosphoric acid fuel cell and the like.

Further, the water electrolyzer 9 and the fuel cell 11 may be a reversible fuel cell having both functions of hydrogen production and power generation. Although the reversible fuel cell has a poor function, it is possible to make the reversible fuel cell compact. For example, by connecting the reversible fuel cell and the hydrogen reservoir 10, it is possible to store hydrogen by the hydrogen reservoir 10, and perform hydrogen production and power generation using hydrogen by the reversible fuel cell.

The detector is a sensor that detects that there is a person in the building 1. The detector may be any sensor as long as it is a sensor that detects that there is a person in the building 1. For example, as illustrated in FIGS. 1A and 1B, the detector may be the wattmeter 8 that detects the electric power supplied from the distribution board 7 to the building 1. The detection signal of the wattmeter 8 is subjected to signal processing by an appropriate signal processing circuit (not illustrated), and then transmitted to the controller 20. Another example of the detector that detects that there is a person in the building 1 will be described in a modification.

When the detector is the wattmeter 8 as in this example, the controller 20 can determine whether there is a person in the building 1 based on whether the detection signal of the wattmeter 8 exceeds a given set value. That is, when the detection signal of the wattmeter 8 is equal to or less than the set value, it is determined that there is no person in the building 1, and when the detection signal of the wattmeter 8 exceeds the set value, it is determined that there is a person in the building 1.

Note that it is preferable that a plurality of the above set values be set for respective power lines in the distribution board 7, for example. That is, although it may be determined whether there is a person in the entire building 1, it is preferable to determine whether there is a person in each of the respective rooms or areas in the building 1.

In addition, in the above description, it is determined that whether there is a person in the building 1 by comparing the magnitude relation between the detection signal of the wattmeter 8 and the set value. However, the present modification is not limited thereto. For example, the controller 20 may determine whether there is a person in the building 1 due to a change in power. As an example, since it can be recognized that the boiling pot has been operated by a human operation when there is a change in power consumption from 500 W to 1 kW instantaneously, the controller 20 can determine that there is a person in the building 1. The boiling pot and its power consumption are examples, and the present modification is not limited to this example. Since a change in power consumption can be grasped in advance even when other electric devices are used, it can be determined whether there is a person in the building 1 due to the change in power consumption.

Next, with reference to the drawings, an example of the configuration of wiring and piping of each equipment of the power system 100 will be described.

The power generation device 2 and the storage battery 3 are connected to the DC/DC converter 5A of the first power converter 5 via wiring 2a and wiring 3a, respectively. Further, the DC/DC converter 5A of the first power converter 5 and the DC/AC converter 5B are connected to each other via internal wiring 5c, and a distribution line 6a of the grid 6 is connected to the DC/AC converter 5B via wiring 7a. The grid 6 is connected to the distribution board 7 via the distribution line 6a. The wattmeter 8 is connected by a connection line (not illustrated) so as to be able to receive one or a plurality of power signals in the distribution board 7. In the building 1, a distribution network (not illustrated) in the building 1 may be provided from the distribution board 7. That is, power lines are laid out from the distribution board 7 in a plurality of rooms or areas in the building 1, and the power consumption in each of these rooms or areas may be configured to be acquired by the wattmeter 8.

In addition, the DC/DC converter 5A of the first power converter 5 and the DC/DC converter 12C of the second power converter 12 are connected to each other via wiring 4a.

In the hydrogen energy storage device 4, the water electrolyzer 9 and the fuel cell 11 are connected to the DC/DC converter 12C of the second power converter 12 via wiring 12a and wiring 12b, respectively. In addition, the water electrolyzer 9 is connected to the hydrogen reservoir 10 via piping 9a, and the hydrogen reservoir 10 is connected to the fuel cell 11 via piping 10a. In this way, it is possible to temporarily store the hydrogen generated by the water electrolyzer 9 in the hydrogen reservoir 10. In addition, such hydrogen can be supplied, in a timely manner, from the hydrogen reservoir 10 as a power generation material of the fuel cell 11.

As described above, the electric power (direct current) generated by the power generation device 2 is supplied to the storage battery 3 via the DC/DC converter 5A of the first power converter 5, and is supplied to the water electrolyzer 9 via the DC/DC converter 5A of the first power converter 5 and the DC/DC converter 12C of the second power converter 12 in a timely manner. At this time, the storage battery 3 is charged. Further, hydrogen is produced through electrolysis of water by the water electrolyzer 9.

Further, the electric power (direct current) generated by the power generation device 2 is transmitted, in a timely manner, to the DC/DC converter 5A of the first power converter 5 and the DC/AC converter 5B of the first power converter 5 in this order, and is converted from DC to AC in the DC/AC converter 5B. The electric power (AC) from the DC/AC converter 5B is supplied to the distribution line 6a of the grid 6. In this way, the electric power generated by the power generation device 2 can be supplied to the distribution board 7 of the building 1 or can be flowed backwardly into the grid 6, as required.

Further, the electric power (direct current) discharged from the storage battery 3 is transmitted, in a timely manner, to the DC/DC converter 5A of the first power converter 5 and the DC/AC converter 5B of the first power converter 5 in this order, and is converted from DC to AC in the DC/AC converter 5B. The electric power (AC) from the DC/AC converter 5B is supplied to the distribution line 6a of the grid 6. In this way, the electric power discharged from the storage battery 3 can be supplied to the distribution board 7 of the building 1.

Further, the electric power (direct current) generated by the fuel cell 11 is transmitted to the DC/DC converter 12C of the second power converter 12, the DC/DC converter 5A of the first power converter 5, and the DC/AC converter 5B of the first power converter 5 in this order, and is converted from DC to AC in the DC/AC converter 5B. The electric power (AC) from the DC/AC converter 5B is supplied to the distribution line 6a of the grid 6. In this way, it is possible to supply the electric power generated by the fuel cell 11 to the distribution board 7 of the building 1.

The controller 20 performs at least one of first control and second control. The first control determines the priority of the power supply from the power generation device 2 using renewable energy to each of the storage battery 3 and the water electrolyzer 9 based on the information detected by the wattmeter 8, the second control determines the priority of the power supply from each of the storage battery 3 and the fuel cell 11 to the power load provided in the building 1 based on the information detected by the wattmeter 8. Note that the controller 20 may control the overall operation of the power system 100.

The controller 20 may have any configuration as long as the controller 20 has a control function. The controller 20 includes, for example, an arithmetic circuit (not illustrated) and a memory circuit (not illustrated) that stores a control program. The arithmetic circuit may include, for example, an MPU, a CPU, and the like. The memory circuit may include, for example, a memory. The controller 20 may be constituted by a single controller that performs centralized control, or may be constituted by a plurality of controllers that performs distributed control in cooperation with each other.

[Operation]

Hereinafter, with reference to the drawings, an example of the operation of the power system 100 of the present embodiment will be described.

The following operation may be performed so that the arithmetic circuit of the controller 20 is implemented by the control program from the memory circuit of the controller 20. However, it is not necessarily indispensable to perform the following operations by the controller 20. An operator may perform part of its operation.

In the case where it is possible to cover the power consumption of the power load provided in the building 1 by the electric power generated by the power generation device 2 during the electric power generation by the power generation device 2, the power consumption of the power load is supplied from the first power converter 5 to the distribution board 7, and the surplus electric power out of the electric power generated by the power generation device 2 is, as required, supplied to one of the storage battery 3, the water electrolyzer 9, and the grid 6. At this time, in the power system 100 of the present embodiment, first control of determining the priority of the power supply from the power generation device 2 to each of the storage battery 3 and the water electrolyzer 9 using renewable energy is performed based on the information detected by the wattmeter 8. A specific example of the first control will be described in the first example.

Further, in the case where it is not possible to cover the power consumption of the power load provided in the building 1 by the electric power generated by the power generation device 2 during the electric power generation by the power generation device 2, the shortage of the power consumption of the power load is, as required, supplied to the distribution board 7 from at least one of the storage battery 3, the fuel cell 11, and the grid 6. Further, while the power generation of the power generation device 2 is stopped, the power consumption of the power load provided in the building 1 is, as required, supplied to the distribution board 7 from at least one of the storage battery 3, the fuel cell 11, and the grid 6. In these cases, in the power system 100 of the present embodiment, second control of determining the priority of the power supply from the storage battery 3 and the fuel cell 11 to the power load provided in the building 1 is performed based on the information detected by the wattmeter 8. A specific example of the second control will be described in the second example.

As mentioned above, the power system 100 of the present embodiment can appropriately store the electric power obtained from renewable energy in the storage battery 3 suitable for short-term energy storage and the water electrolyzer 9 suitable for long-term energy storage. In this way, highly efficient power control of the power system 100 is performed.

In addition, the power system 100 of the present embodiment can appropriately supply the electric power to the power load provided in the building from the storage battery 3 suitable for short-term energy output and the fuel cell 11 suitable for long-term energy output. In this way, highly efficient power control of the power system 100 is performed.

First Example

The power system 100 of the present embodiment is the same as the power system 100 of the embodiment except for the control by the controller 20 described below.

When the wattmeter 8 detects that there is a person in the building 1, the controller 20, in the first control described above, prioritizes the storage battery 3 over the water electrolyzer 9 to cause the storage battery 3 to receive the electric power from the power generation device 2 using renewable energy.

When the wattmeter 8 detects that there is a person in the building 1, the controller 20, in the first control described above, prioritizes the water electrolyzer 9 over the storage battery 3 to cause the water electrolyzer 9 to receive the electric power from the power generation device 2 using renewable energy.

An example of the first control by the controller 20 is illustrated in the following Table 1. The symbols used in this example are defined below.

Definition of Symbols

Ws: Surplus electric power of the power generation device 2

Wsix: Maximum electric power which can be charged in the storage battery 3

Whix: Maximum electric power that the water electrolyzer 9 can receive

For example, Wsix may correspond to the maximum output of a charger (not illustrated) that charges the storage battery 3. Further, for example, Whix may correspond to the maximum output of the second power converter 12.

TABLE 1

| Detection of Person | Storage Battery | Water Electrolyzer | Grid |
| --- | --- | --- | --- |
| Present | Charge up to the maximum Wsix within the range of Ws | Receive up to the maximum Whix within the range of (Ws − Wsix) in the case of Ws > Wsix | Transmit (Ws − Wsix − Whix) to the grid in the case of Ws > (Wsix + Whix) |
| Not present | Receive up to the maximum Wsix within range of (Ws − Whix) in the case of Ws > Whix, | Receive up to the maximum Whix in the range of Ws | Transmit (Ws − Wsix − Whix) to the grid in the case of Ws > (Wsix + Whix) |

The power control when the surplus electric power Ws is generated in the power generation device 2 (Ws>0) is described in the above Table 1.

As illustrated in the upper part of Table 1, when the wattmeter 8 detects that there is a person in the building 1, first, the storage battery 3 is prioritized over the water electrolyzer 9, and the storage battery 3 is charged (storage) up to the maximum electric power Wsix within the range of the surplus electric power Ws of the electric power generation device 2. That is, when the surplus electric power Ws is smaller than the maximum electric power Wsix (Ws<Wsix), the entire amount of surplus electric power Ws is supplied to the storage battery 3, and surplus electric power Ws is not supplied to the water electrolyzer 9.

On the other hand, when the surplus electric power Ws is larger than the maximum electric power Wsix (Ws>Wsix), the electric power is received by the water electrolyzer 9 up to the maximum electric power Whix in the range of the remaining electric power (Ws−Wsix) out of the surplus electric power Ws. As a result, hydrogen produced by the water electrolyzer 9 is stored in the hydrogen reservoir 10, so that hydrogen storage (storage) is performed in the hydrogen energy storage device 4.

When the surplus electric power Ws is larger than the sum of the maximum electric power Wsix and the maximum electric power Whix (Ws>(Wsix+Whix)), electric power (Ws−Wsix−Whix) is transmitted to the grid 6 (for example, sold).

The reason for performing the above power control is as follows.

When the wattmeter 8 detects that there is a person in the building 1, it is predicted that the power consumption of the power load provided in the building 1 will increase after this detection. At this time, the storage battery 3 capable of receiving high power with a higher energy conversion efficiency is prioritized over the water electrolyzer 9, and the storage battery 3 is caused to receive the surplus electric power Ws of the power generation device 2, so that the amount of electricity stored in the storage battery 3 is increased as much as possible, and it is possible to prepare for an increase in power consumption of the power load.

Next, as illustrated in the lower part of Table 1, when the wattmeter 8 does not detect that there is a person in the building 1, first, the water electrolyzer 9 is prioritized over the storage battery 3, and the water electrolyzer 9 is caused to receive the electric power up to the maximum electric power Whix within the range of the surplus electric power Ws of the electric power generation device 2. In other words, when the surplus electric power Ws is smaller than the maximum electric power Whix (Ws<Whix), the entire amount of the surplus electric power Ws is supplied to the water electrolyzer 9, and the surplus electric power Ws is not supplied to the storage battery 3. As a result, hydrogen produced by the water electrolyzer 9 is stored in the hydrogen reservoir 10, so that hydrogen storage (storage) is performed in the hydrogen energy storage device 4.

On the other hand, when the surplus electric power Ws is larger than the maximum electric power Whix (Ws>Whix), the storage battery 3 is charged (storage) up to the maximum electric power Wsix within the range of the remaining electric power (Ws−Whix) of the surplus electric power Ws.

When the surplus electric power Ws is larger than the sum of the maximum electric power Wsix and the maximum electric power Whix (Ws>(Wsix+Whix)), electric power (Ws−Wsix−Whix) is transmitted to the grid 6 (for example, sold).

The reason for performing the above power control is as follows.

When the detector does not detect that there is a person in the building 1, it is predicted that the power consumption of the power load provided in the building 1 will not increase for a while after this detection. That is, it is predicted that the period during which the surplus electric power Ws of the power generation device 2 is generated will continue for a while.

At this time, if the storage battery 3 having storage capacity smaller than that of the hydrogen energy storage device 4 (the water electrolyzer 9 and the hydrogen reservoir 10) is prioritized over the hydrogen energy storage device 4, and the storage battery 3 is caused to receive the power generated by the power generation device 2, the storage battery 3 may be fully charged at an early stage. As a result, in the remaining period during which the surplus electric power Ws of the power generation device 2 is generated, it is necessary to store hydrogen (power reception) using this surplus electric power Ws only by the water electrolyzer 9 having the smaller maximum electric power that can be received than the storage battery 3. In this case, since there is a possibility that the surplus electric power Ws that cannot be received by the water electrolyzer 9 is transmitted to the grid 6, the amount of electricity stored in the storage battery 3 and the hydrogen energy storage device 4 may decrease during the period in which the surplus electric power Ws of the power generation device 2 is generated.

The amount of electricity stored in the hydrogen energy storage device 4 correspond to a value obtained by converting the amount of hydrogen stored in the hydrogen reservoir 10 by generating hydrogen by electrolysis of water by the water electrolyzer 9 using electric power as the amount of electricity generated by the fuel cell 11. The storage capacity of the hydrogen energy storage device 4 corresponds to a value obtained by converting the amount of hydrogen stored in the hydrogen reservoir 10 as the he amount of electricity generated by the fuel cell 11. Further, the amount of electricity stored in the storage battery 3 and the hydrogen energy storage device 4 correspond to the sum of the charge amount of the storage battery 3 using the surplus electric power Ws of the power generation device 2, and the charge amount of the hydrogen energy storage device 4.

Therefore, the power system 100 according to the present embodiment prioritizes the water electrolyzer 9 over the storage battery 3 when the wattmeter 8 does not detect that there is a person in the building 1, and causes the water electrolyzer 9 to receive the electric power generated by the power generation device 2, so that it is possible to extend the period before the storage battery 3 is fully charged. As a result, the period during which power is received by both the storage battery 3 and the water electrolyzer 9 among the period in which the surplus electric power Ws of the power generation device 2 is generated is extended. Therefore, the amount of electric power transmitted to the grid 6 can be reduced during the period in which the surplus electric power Ws of the power generation device 2 is generated. In this way, the power system 100 according to the present embodiment can increase the amount of electricity stored in the storage battery 3 and the hydrogen energy storage device 4 when the wattmeter 8 does not detect that there is a person in the building 1, compared with a case where the storage battery 3 is caused to preferentially receive the power generated by the power generation device 2.

When no person is present in the building 1, the power consumption of the power load provided in the building 1 is small and the continuity of the period in which the surplus electric power Ws is generated can be expected. Therefore, even if control is performed so that the water electrolyzer 9 preferentially receives the surplus electric power Ws, it is probable that the number of times of starting and stopping of the hydrogen energy storage device 4 be small, so that it is possible to suppress a decrease in the efficiency of the power system 100.

The power system 100 of the present embodiment may be the same as the power system 100 of the embodiment except for the above features.

Second Example

The power system 100 of the present embodiment is the same as the power system 100 of the embodiment except for the control by the controller 20 described below.

When the wattmeter 8 detects that there is a person in the building 1, the controller 20, in the above-described second control, prioritizes the fuel cell 11 over the storage battery 3, and causes the fuel cell 11 to supply electric power to the power load provided in the building 1.

When the wattmeter 8 detects that there is a person in the building 1, the controller 20, in the above-described second control, prioritizes the storage battery 3 over the fuel cell 11, and causes the storage battery 3 to supply electric power to the power load provided in the building 1.

An example of the second control by the controller 20 is illustrated in the following Table 2. The symbols used in this example are defined below. [Definition of Symbols]
- W0: Power consumption of the power load provided in the building 1
- Wsox: Maximum electric power that can be discharged from the storage battery 3
- Whox: Maximum electric power that the fuel cell 11 can generate

TABLE 2

| Detection of Person | Storage Battery | Fuel Cell | Grid |
|---|---|---|---|
| Present | Discharge up to the maximum Wsox within the range of (W0 − Whox) in the case of W0 > Whox | Generate electricity up to the maximum Whox within the range of W0 | Receive (W0 − Wsox − Whox) from the grid in the case of W0 > (Wsox + Whox) |
| Not present | Discharge up to the maximum Wsox within the range of W0 | Generate up to the maximum Whox within the range of (W0 − Wsox) in the case of W0 > Wsox | Receive (W0 − Wsox − Whox) from the grid in the case of W > (Wsox + Whox) |

The power control when the surplus electric power Ws is not generated in the power generation device 2 (Ws=0) is described in the above Table 2.

As illustrated in the upper part of Table 2, when the wattmeter 8 detects that there is a person in the building 1, first, the fuel cell 11 is prioritized over the storage battery 3, and the fuel cell 11 generates the power up to the maximum electric power Whox within the range of the power consumption W0 of the power load provided in the building 1. That is, when the power consumption W0 is smaller than the maximum electric power Whox (W0<Whox), the entire amount of the power consumption W0 is generated by the fuel cell 11, and the storage battery 3 is not discharged.

On the other hand, when the power consumption W0 is larger than the maximum electric power Whox (W0>Whox), the storage battery 3 is discharged up to the maximum electric power Wsox within the range of the remaining power (W0-Whox) of the power consumption W0.

When the power consumption W0 is larger than the sum of the maximum electric power Wsox and the maximum electric power Whox (W0>(Wsox+Whox)), electric power (W0-Wsox-Whox) is received from the grid 6.

The reason for performing the above power control is as follows.

When the wattmeter 8 detects that there is a person in the building 1, it is predicted that the power consumption W0 of the power load provided in the building 1 will increase after this detection. Therefore, when the surplus electric power Ws of the power generation device 2 is zero (Ws=0), the fuel cell 11 having a slower response than the storage battery 3 is activated, and the electric power is supplied to the power load preferentially from the fuel cell 11, so that the electric power of the storage battery 3 can be saved. In this way, the power system 100 according to the present embodiment can increase the electric power supplied from the storage battery 3 and the fuel cell 11 to the power load, compared with the case where the electric power is supplied to the power load preferentially from the storage battery 3. More detail in this regard will be described.

As mentioned above, although the storage battery 3 has a small storage capacity, the storage battery 3 can output high power with high energy conversion efficiency, compared with the hydrogen energy storage device 4.

Therefore, if the storage battery 3 is preferentially discharged, there is a possibility that the amount of electricity stored in the storage battery 3 becomes zero at an early stage. As a result, the electric power is generated only by the fuel cell 11 of the hydrogen energy storage device 4 during the remaining period when the surplus electric power Ws of the power generation device 2 is zero (Ws=0). Since the hydrogen energy storage device 4 has a large storage capacity, and the maximum electric power of the fuel cell 11 is small, compared with the storage battery 3, there is a possibility that hydrogen may remain while hydrogen in the hydrogen reservoir 10 of the hydrogen energy storage device 4 is not sufficiently consumed during the remaining period.

Therefore, the power system 100 of the present embodiment causes the fuel cell 11 to preferentially generate the power. As an example, the supply of the base electric power out of the power consumption W0 of the power load from the fuel cell 11, and the supply of the short term fluctuating power out of electric power W0 of the power load from the storage battery 3 make it possible to increase the electric power supplied from both of them. In this way, it is possible to extend the period before the amount of electricity stored in the storage battery 3 becomes zero. As a result, is possible to increase the hydrogen consumption amount in the hydrogen reservoir 10 of the hydrogen energy storage device 4 in the remaining period. In other words, it is possible to increase the electric power to be supplied to the power load from the storage battery 3 and the fuel cell 11.

When a person is present in the building 1, it is possible to anticipate the continuous power supply to the power load provided in the building 1. Therefore, even if control is performed so that the fuel cell 11 preferentially generates electricity, it is probable that the number of times of starting and stopping of the hydrogen energy storage device 4 be small, so that it is possible to suppress a decrease in the efficiency of the power system 100.

As illustrated in the lower part of Table 1, when the wattmeter 8 does not detect that there is a person in the building 1, first, the storage battery 3 is prioritized over the fuel cell 11, and the storage battery 3 is discharged up to the maximum electric power Wsox within the range of the power consumption W0 of the power load provided in the building 1. That is, when the power consumption W0 is smaller than the maximum electric power Wsox (W0<Wsox), the entire amount of the power consumption W0 is covered by the discharge from the storage battery 3, and the fuel cell 11 does not generate the power.

On the other hand, when the power consumption W0 is larger than the maximum electric power Wsox (W0>Wsox), the fuel cell 11 generates the power up to the maximum electric power Whox within the range of the remaining power (W0-Wsox) of the power consumption W0.

When the power consumption W0 is larger than the sum of the maximum electric power Wsox and the maximum electric power Whox (W0>(Wsox+Whox)), electric power (W0-Wsox-Whox) is received from the grid 6.

The reason for performing the above power control is as follows.

When the wattmeter 8 does not detect that there is a person in the building 1, it is predicted that the power consumption W0 of the power load provided in the building 1 will not increase for a while after this detection. That is, in this case, even if the electric power is supplied to the power load preferentially from the storage battery 3, it is possible to cover the power consumption W0 of the power load within the range of the storage capacity of the storage battery 3. At this time, if the electric power is supplied to the power load preferentially from the fuel cell 11, there is a possibility that intermittent low output and low efficiency operation in the fuel cell 11 is performed. However, the power system 100 of the present embodiment can reduce this possibility under the second control described above.

The power system 100 according to the present embodiment may be the same as the power system 100 according to the embodiment or the first example of the embodiment except for the above-described features.

First Modification

Figure 2:
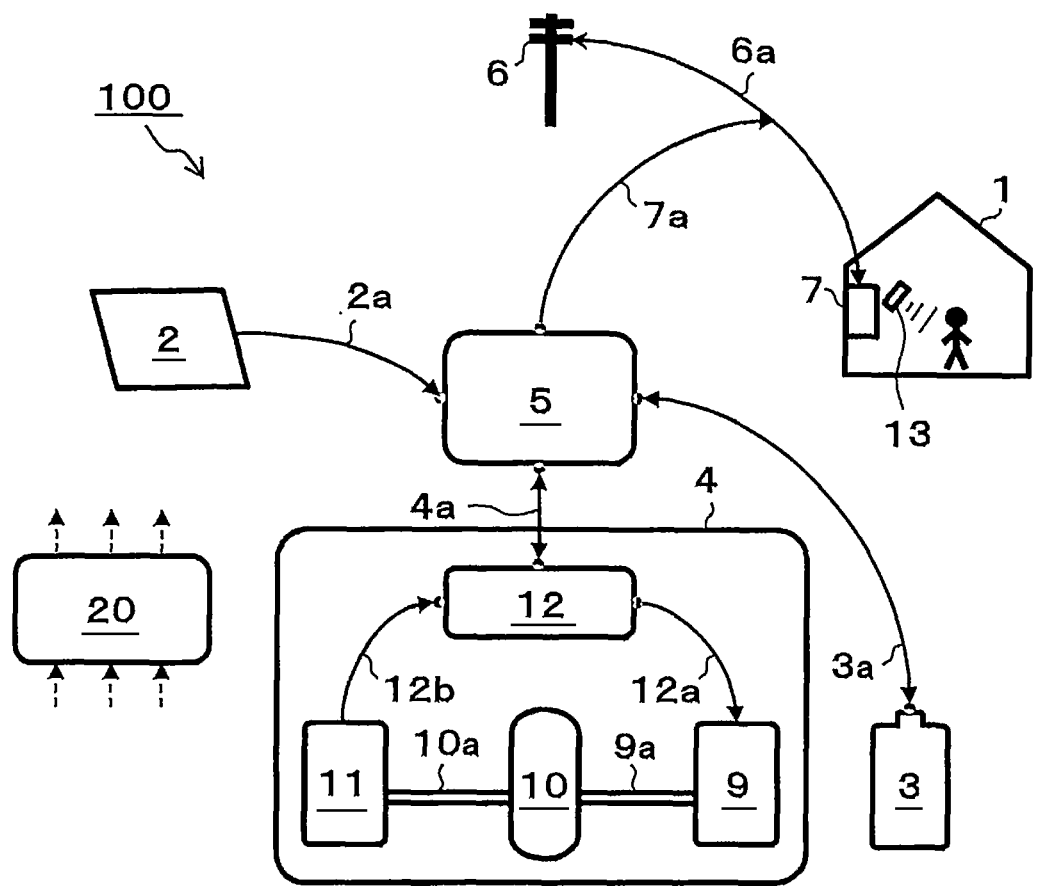
FIG. 2 is a diagram illustrating an example of a power system according to a first modification of the embodiment.

FIG. 2 is a diagram illustrating an example of a power system according to a first modification of the embodiment.

The power system 100 of FIG. 2 is the same as the power system 100 of FIG. 1A except that a human detection sensor 13 instead of the wattmeter 8 as a detector that detects that there is a person in the building 1 is used.

The human detection sensor 13 is a sensor that detects a person. The human detection sensor 13 may include, for example, an infrared sensor, but it is not limited thereto. For example, the human detection sensor 13 may be attached to the doorway of the building 1, or may be provided in an appropriate room in the building 1. In FIG. 2, although only one room in the building 1 is illustrated, the human detection sensor 13 may be provided in each of the rooms in a case where there is a plurality of rooms in the building 1. In this case, although the detection accuracy of a person existing in the building 1 can be improved, cost effectiveness should be considered as the cost increases.

When a person is detected by the human detection sensor 13, a predetermined signal is generated in the human detection sensor 13. The detection signal of the human detection sensor 13 is subjected to signal processing by an appropriate signal processing circuit (not illustrated), and then transmitted to the controller 20. In this way, the controller 20 can determine whether there is a person in the building 1.

The power system 100 according to the present modification may be the same as the power system 100 according to any of the embodiment, the first example of the embodiment, and the second example of the embodiment except for the above-described features. That is, as in the power system 100 according to any of the embodiment, the first example of the embodiment, and the second example of the embodiment, the power system 100 of the present modification performs highly efficient power control by executing at least one of the first control and the second control.

Second Modification

Figure 3:
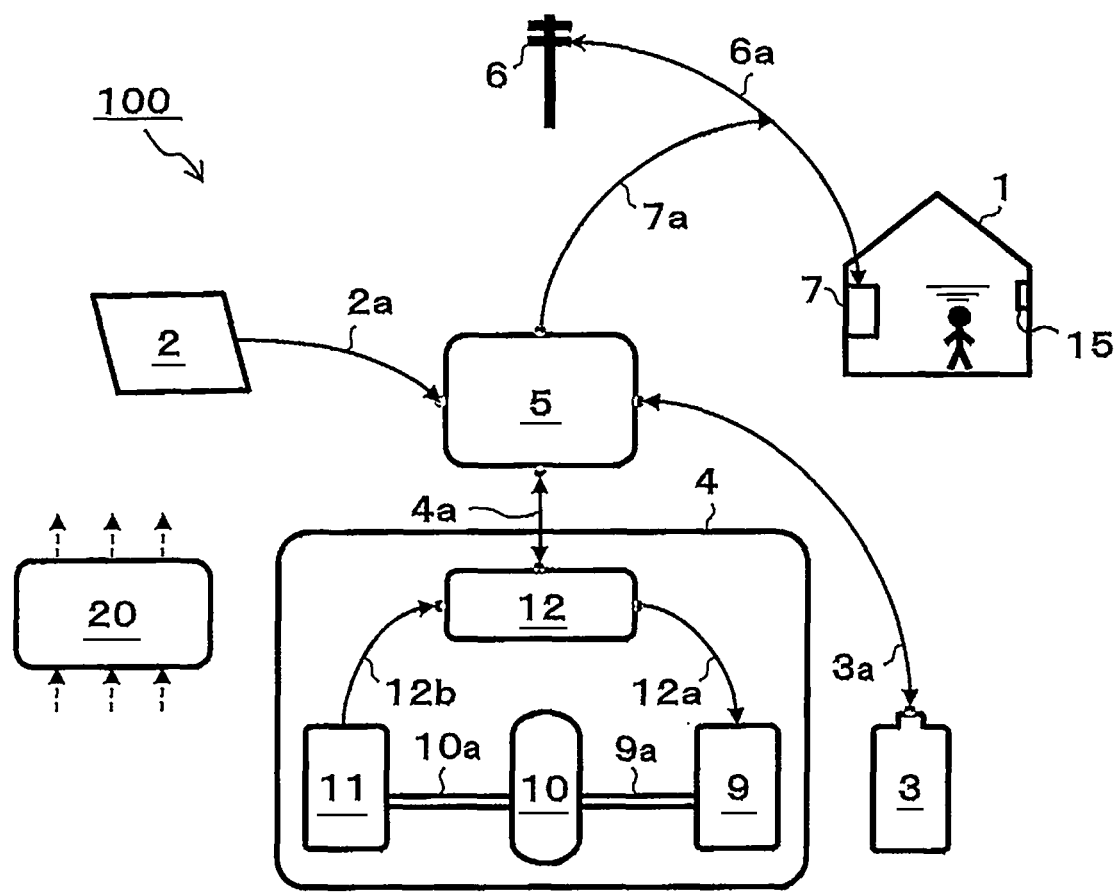
FIG. 3 is a diagram illustrating an example of a power system according to a second modification of the embodiment.

FIG. 3 is a diagram illustrating an example of a power system according to a second modification of the embodiment.

The power system 100 of FIG. 3 is the same as the power system 100 of FIG. 1A except that a $CO_2$ gas sensor 15 instead of the wattmeter 8 as a detector that detects that there is a person in the building 1 is used.

The $CO_2$ gas sensor 15 is provided at an appropriate position in the building 1, and is a sensor that detects $CO_2$ generated by human breathing. The $CO_2$ gas sensor 15 is often provided, for example, to appropriately adjust the $CO_2$ concentration in the room of the building 1 with a ventilation facility. In FIG. 3, although only one room in the building 1 is illustrated, the $CO_2$ gas sensor 15 may be provided in each of the rooms in a case where there is a plurality of rooms in the building 1. In this case, although the detection accuracy of a person existing in the building 1 can be improved, cost effectiveness should be considered as the cost increases.

When a person is present in the building 1, $CO_2$ concentration rises due to human breathing. When the $CO_2$ concentration measured by the $CO_2$ gas sensor 15 exceeds a predetermined set value, a predetermined signal is generated in the $CO_2$ gas sensor 15. The detection signal of the $CO_2$ gas sensor 15 is subjected to signal processing by an appropriate signal processing circuit (not illustrated), and then transmitted to the controller 20 in a timely manner. In this way, the controller 20 can determine whether there is a person in the building 1.

Normally, since the $CO_2$ concentration in the air is about 400 ppm or less, for example, the $CO_2$ concentration of about 500 ppm to 1,000 ppm may be used as the above set value. Note that this set value is an example, and is not limited to this example.

For the infrared sensor which is an example of the human detection sensor 13 of the first modification, it is difficult to detect that there is a person in the building 1, for example, if there is no person on the infrared due to furniture in the room or complicated construction. However even in such a case, the $CO_2$ gas sensor 15 can properly detect that there is a person in the building 1 unless the $CO_2$ gas sensor 15 and the person are spatially obstructed.

The power system 100 according to the present modification may be the same as the power system 100 according to any of the embodiment, the first example of the embodiment, and the second example of the embodiment except for the above-described features. That is, as in the power system 100 according to any of the embodiment, the first example of the embodiment, and the second example of the embodiment, the power system 100 of the present modification performs highly efficient power control by executing at least one of the first control and the second control.

Third Modification

Figure 4:
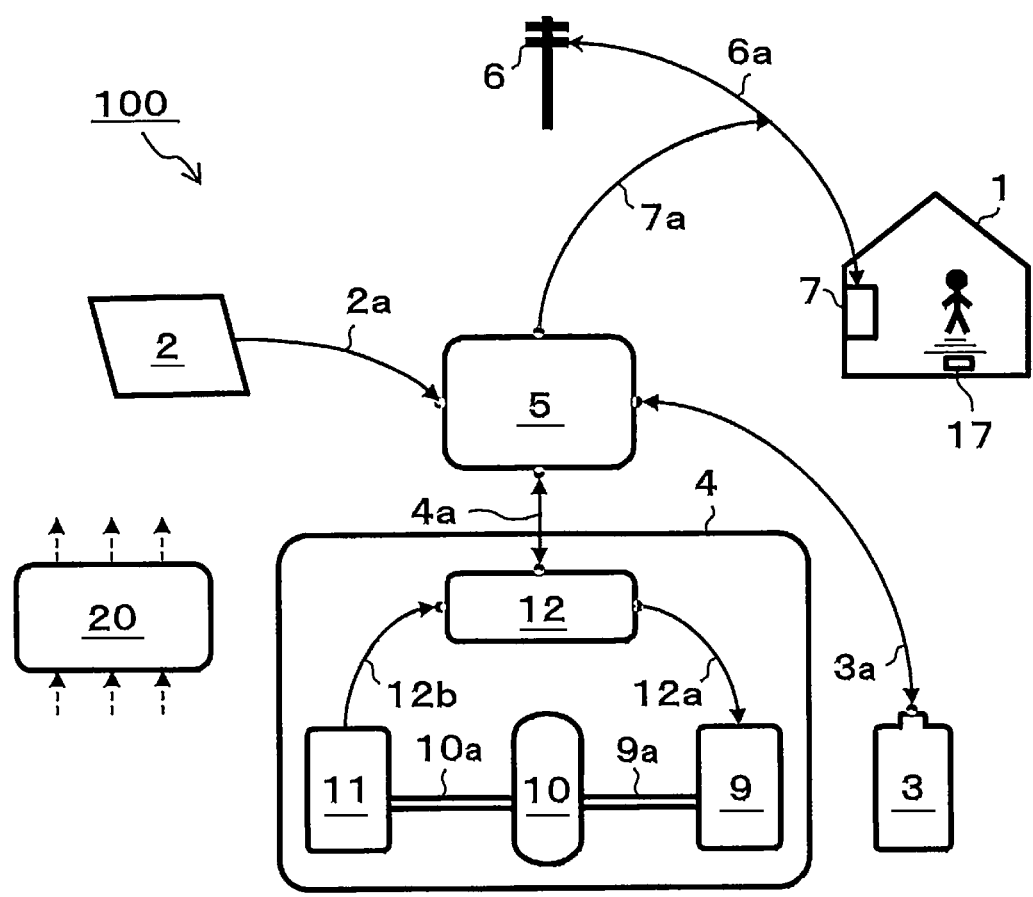
FIG. 4 is a diagram illustrating an example of a power system according to a third modification of the embodiment.

FIG. 4 is a diagram illustrating an example of a power system according to a third modification of the embodiment.

The power system 100 of FIG. 4 is the same as the power system 100 of FIG. 1A except that a vibration sensor 17 instead of the wattmeter 8 as a detector that detects that there is a person in the building 1 is used.

The vibration sensor 17 is provided on the floor of the building 1, and is a sensor that detects a vibration occurring in the building 1 due to human walking or the like. The vibration sensor 17 may have any configuration as long as the vibration sensor 17 is a sensor for picking up and detecting the vibration of the floor of the building 1. The vibration sensor 17 may be a contact vibration sensor, or a non-contact vibration sensor. The contact vibration sensor may include, for example, a piezoelectric element, a electromagnetic sensor, or the like, but not limited thereto. The non-contact vibration sensor may include, for example, an electrostatic capacity sensor, an eddy current sensor, a laser Doppler sensor or the like, but not limited thereto. In FIG. 4, although only one room in the building 1 is illustrated, the vibration sensor 17 may be provided in each of the rooms in a case where there is a plurality of rooms in the building 1. In this case, the detection accuracy of a person existing in the building 1 can be improved. For example, if there is only one vibration sensor 17, it is necessary to detect a vibration caused by walking of a person through the entire building 1 with a single vibration sensor 17. For this reason, when a person is present at a position away from the vibration sensor 17, only low-level slight vibration is transmitted to the vibration sensor 17, so that the controller 20 may erroneously determine that a person is not present in the building 1. However, since the installation of the plurality of vibration sensors 17 increases the cost, cost effectiveness should be considered.

When a person walks in the building 1, the vibration occurs on the floor of the building 1. When the vibration measured by the vibration sensor 17 exceeds a predetermined set value, a predetermined signal is generated in the vibration sensor 17. The detection signal of the vibration sensor 17 is subjected to signal processing by an appropriate signal processing circuit (not illustrated), and then transmitted to the controller 20. In this way, the controller 20 can determine whether there is a person in the building 1.

Usually, even if no person is present in the building 1, the vibration occurs on the floor of the building 1. Therefore, the above set value is set as a threshold value in order not to erroneously detect such a minute vibration by the vibration sensor 17.

For the infrared sensor which is an example of the human detection sensor 13 of the first modification, it is difficult to detect that there is a person in the building 1, for example, if there is no person on the infrared due to furniture in the room or complicated construction. However even in such a case, the vibration sensor 17 can properly detect that there is a person in the building 1 as long as the vibration due to walking of a person is propagated to the vibration sensor 17.

The vibration due to walking of a person has various characteristics such as an acceleration, a displacement amount and a frequency. Therefore, it is possible to learn the action of a person in the building 1, the attribute of a person such as an adult or a child based on the analysis of the characteristics of the vibration detected by the vibration sensor 17.

The power system 100 according to the present modification may be the same as the power system 100 according to any of the embodiment, the first example of the embodiment, and the second example of the embodiment except for the above-described features. That is, as in the power system 100 according to any of the embodiment, the first example of the embodiment, and the second example of the embodiment, the power system 100 of the present modification performs highly efficient power control by executing at least one of the first control and the second control.

The embodiments, the first example to the second example of the embodiment, and the first modification to the third modification of the embodiment may be combined with each other unless mutually is excluded.

In addition, from the above description, many improvements and other embodiments of the present disclosure will be apparent to those skilled in the art. Accordingly, the above description should be construed as illustration only, and is provided for the purpose of teaching those skilled in the art the best mode for carrying out the present disclosure. Without departing from the spirit of the present disclosure, it is possible to substantially change the details of its structure and/or function.

For example, in the above description, as a detector that detects that there is a person in the building 1, the wattmeter 8, the human detection sensor 13, the $CO_2$ gas sensor 15, and the vibration sensor 17 are illustrated, but the detector is not limited thereto. For example, the controller 20 may receive a signal indicating the presence or absence of a person in the building 1 from equipment having an interface with a person by connecting the device with an energy management system (EMS), a home hub, or the like. The equipment having an interface with a person may include, for example, information terminals such as a smartphone, a tablet terminal, and a personal computer.

What is claimed is:

1. A power system comprising:
    a storage battery, wherein the storage battery has a maximum electric power Wsix which can be charged;
    a water electrolyzer, wherein the water electrolyzer can receive a maximum electric power Whix;
    a fuel cell that generates electricity using hydrogen supplied from a hydrogen reservoir that stores hydrogen generated by the water electrolyzer;
    a power generation device using renewable energy; and
    a controller including a processor and a memory circuit storing a control program, wherein the control program, when executed by the processor, causes the controller to:
        cause a detector to detect whether there is a person in a building, determine whether a surplus of electric power Ws of the power generation device is smaller than the maximum electric power Wsix of the storage battery or the maximum electric power Whix that the water electrolyzer can receive, determine whether a power load WO of the building is smaller than a maximum electric power Wsox of the storage battery that can be discharged or a maximum electric power Whox that the fuel cell can generate and to output detection results, and
    perform at least one of first control and second control,
    the first control comprises determining a priority between the storage battery and the water electrolyzer, as a destination to which electric power is supplied from a power generation device using renewable energy, based on the detection results detected by the detector that whether there is a person in a building and whether a surplus of electric power Ws of the power generation device is smaller than the maximum electric power Wsix of the storage battery or the maximum electric power Whix that the water electrolyzer can receive, and cause the storage battery or water electrolyzer to receive the electric power from the power generation device, in the first control, and
    the second control comprises determining a priority between the storage battery and the fuel cell, as a source from which electric power is supplied to a power load provided in the building, based on the detection results detected by the detector whether there is a person in a building and whether the power load WO of the building is smaller than the maximum electric power Wsox of the storage battery or the maximum electric power Whox that the fuel cell can generate, and cause the fuel cell or the storage battery to supply the electric power to the power load, in the second control.

2. The power system according to claim 1, wherein the control program causes the controller to, when the detection results indicate that there is a person in the building and the surplus of electric power Ws of the power generation device is smaller than the maximum electric power Wsix of the storage battery, prioritize the storage battery over the water electrolyzer as a destination to which the electric power is supplied from the power generation device using renewable energy, and cause the storage battery to receive the electric power from the power generation device, in the first control.

3. The power system according to claim 1, wherein the control program causes the controller to, when the detection results indicate that there is no person in the building and the surplus of electric power Ws of the power generation device is smaller than the maximum electric power Whix that the water electrolyzer can receive, prioritize the water electrolyzer over the storage battery as a destination to which the electric power is supplied from the power generation device using renewable energy, and cause the water electrolyzer to receive the electric power from the power generation device, in the first control.

4. The power system according to claim 1,
wherein the power system provides power to a building and the building has a power load W0, the storage battery has a maximum electric power Wsox that can be discharged, and the fuel cell has a maximum electric power Whox that the fuel cell can generate, and
wherein the control program causes the controller to, when the detection result indicates that there is a person in the building and the power load W0 of the building is smaller than the maximum electric power Whox that the fuel cell can generate, prioritize the fuel cell over the storage battery as a source from which the electric power is supplied to the power load, and cause the fuel cell to supply the electric power to the power load, in the second control.

5. The power system according to claim 1,
wherein the power system provides power to a building and the building has a power load W0, the storage battery has a maximum electric power Wsox that can be discharged, and the fuel cell has a maximum electric power Whox that the fuel cell can generate, and
wherein the control program causes the controller to, when the detection result indicates that there is no person in the building and the power load W0 of the building is smaller than the maximum electric power Wsox of the storage battery, prioritize the storage battery over the fuel cell as a source from which the electric power is supplied to the power load, and cause the storage battery to supply electric power to the power load, in the second control.

6. The power system according to claim 1, wherein the detector is at least one of a wattmeter, a human detection sensor, a $CO_2$ gas sensor, and a vibration sensor.

7. The power system according to claim 1, wherein the detector is a wattmeter, and the control program causes the controller to determine whether there is a person in the building based on whether a detection signal of the wattmeter exceeds a predetermined set value.

8. The power system according to claim 1, wherein the detector is a human detection sensor, and the human detection sensor includes an infrared sensor.

9. The power system according to claim 1, wherein the detector is a $CO_2$ gas sensor, and the control program causes the controller to cause the $CO_2$ gas sensor to detect $CO_2$ generated by the person.

10. The power system according to claim 9, wherein when $CO_2$ concentration measured by the $CO_2$ gas sensor exceeds a predetermined set value, a predetermined signal is generated in the $CO_2$ gas sensor.

11. The power system according to claim 10, wherein the predetermined set value is in the range of 500 ppm to 1,000 ppm.

12. The power system according to claim 1, wherein the detector is a vibration sensor, and the control program causes the controller to cause the vibration sensor to detect a vibration occurring in the building due to human walking.

13. The power system according to claim 12, wherein the control program causes the controller to cause the vibration sensor to pick up and detect the vibration of a floor of the building.

14. The power system according to claim 13, wherein when the vibration measured by the vibration sensor exceeds a predetermined set value, a predetermined signal is generated in the vibration sensor.

* * * * *